(12) United States Patent
Hatonen et al.

(10) Patent No.: US 11,234,151 B2
(45) Date of Patent: Jan. 25, 2022

(54) MANAGEMENT PLANE PERFORMANCE INDICATOR TRANSFER

(71) Applicant: Nokia Technologies Oy, Espoo (FI)

(72) Inventors: Kimmo Kalervo Hatonen, Helsinki (FI); Shubham Kapoor, Helsinki (FI); Ville Matti Kojola, Oulu (FI); Sasu Tarkoma, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 43 days.

(21) Appl. No.: 16/629,325

(22) PCT Filed: Jul. 14, 2017

(86) PCT No.: PCT/EP2017/067822
§ 371 (c)(1),
(2) Date: Jan. 8, 2020

(87) PCT Pub. No.: WO2019/011441
PCT Pub. Date: Jan. 17, 2019

(65) Prior Publication Data
US 2021/0076239 A1    Mar. 11, 2021

(51) Int. Cl.
*H04W 24/10*    (2009.01)
*H04L 12/26*    (2006.01)

(52) U.S. Cl.
CPC ........... *H04W 24/10* (2013.01); *H04L 43/028* (2013.01)

(58) Field of Classification Search
CPC . H04L 1/0026; H04L 1/0029; H04L 41/0604; H04L 41/0627; H04L 41/0681; H04L 43/02; H04L 43/028; H04W 24/10; H04B 7/0626; H04B 7/0658; H04B 17/101; H04B 17/24; H04B 17/309
See application file for complete search history.

(56) References Cited

U.S. PATENT DOCUMENTS 6,766,418 B1 * 7/2004 Alexander .............. G06F 16/10
711/129
7,145,954 B1 * 12/2006 Pendergrass ......... H04B 1/7172
375/247
2012/0113824 A1   5/2012 Olsson
(Continued)

FOREIGN PATENT DOCUMENTS

EP       2836004 A1    2/2015
WO    2013/066241 A1    5/2013

OTHER PUBLICATIONS

International Search Report and Written Opinion received for corresponding Patent Cooperation Treaty Application No. PCT/EP2017/067822, dated Mar. 15, 2018, 12 pages.
(Continued)

*Primary Examiner* — Kan Yuen
(74) *Attorney, Agent, or Firm* — Nokia Technologies Oy

(57) ABSTRACT

There is provided a method in a first device of a cellular communication system, the method comprising: acquiring a first value of a performance indicator; causing a transmission of management plane performance data to a second device of the cellular communication system, said performance data comprising said first value; acquiring a second value of the performance indicator; and preventing a transmission of the second value if the second value is substantially equal to the first value.

15 Claims, 11 Drawing Sheets

(56) References Cited

U.S. PATENT DOCUMENTS

| | | | |
|---|---|---|---|
| 2013/0115958 A1* | 5/2013 | Wei | H04W 24/10 |
| | | | 455/437 |
| 2016/0241483 A1* | 8/2016 | Turanyi | H04L 47/2458 |
| 2018/0234309 A1* | 8/2018 | Li | H04L 43/08 |

OTHER PUBLICATIONS

Silberstein et al., "Constraint Chaining: On Energy-Efficient Continuous Monitoring in Sensor Networks", Proceedings of the 2006 ACM SIGMOD international conference on Management of data, Jun. 27-29, 2006, pp. 157-168.

Office action received for corresponding European Patent Application No. 17740376.3, dated Jun. 7, 2021, 8 pages of office action.

* cited by examiner

590: PERFORMANCE INDICATOR

590: PERFORMANCE INDICATOR

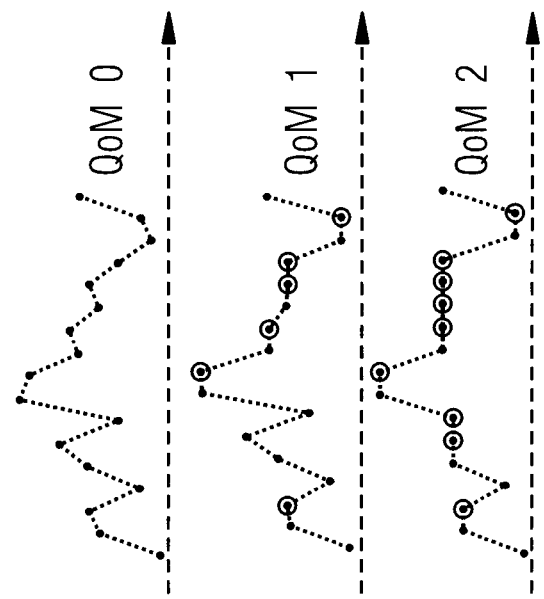
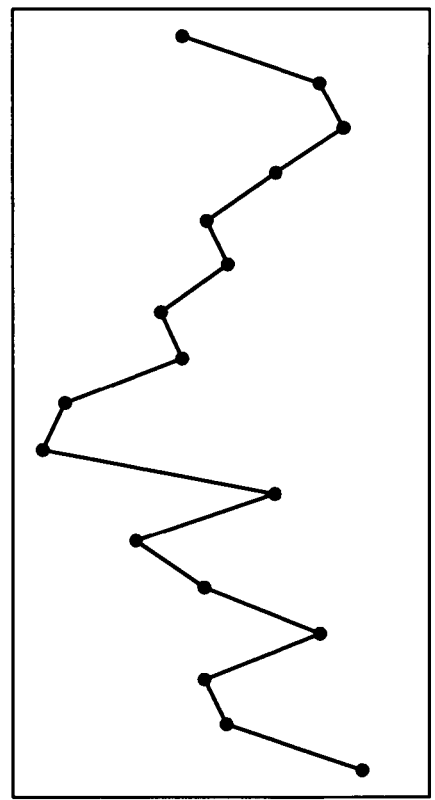
FIG 6A

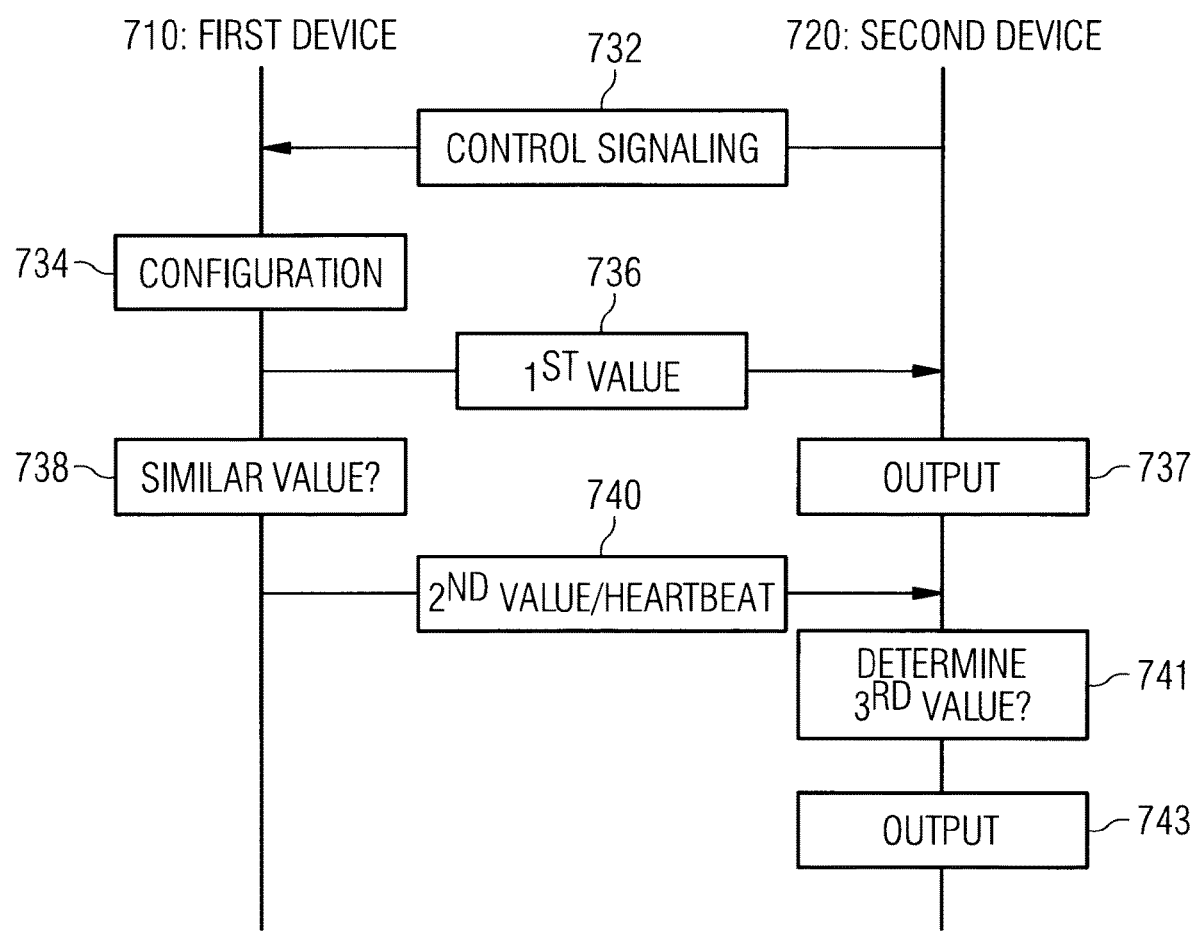

MANAGEMENT PLANE PERFORMANCE INDICATOR TRANSFER

RELATED APPLICATION

This application was originally filed as PCT Application No. PCT/EP2017/067822 on Jul. 14, 2017.

TECHNICAL FIELD

The invention relates to communications. More particularly, the present invention relates to transferring Management Plane performance indicators.

BACKGROUND

In a communication network, management plane entity or entities may be used to gather management plane data comprising one or more performance indicators. The performance indicators may be measured and/or acquired by network devices and transmitted to said management plane entity or entities. As the number of devices in the present communication networks increases, there may be a need to provide solutions which may decrease amount of transferred management plane data.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which

FIGS. 6A-6C illustrate some embodiments;

FIG. 7 illustrates an embodiment; and

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced (LTE-A) or 5G New Radio (NR) (sometimes referred to simply as 5G).

5G is likely to use multiple input-multiple output (MIMO) techniques (e.g. antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility. It is further noted that LTE may refer both to regular LTE or LTE-A, or any other LTE-based system on technology.

Figure 1:
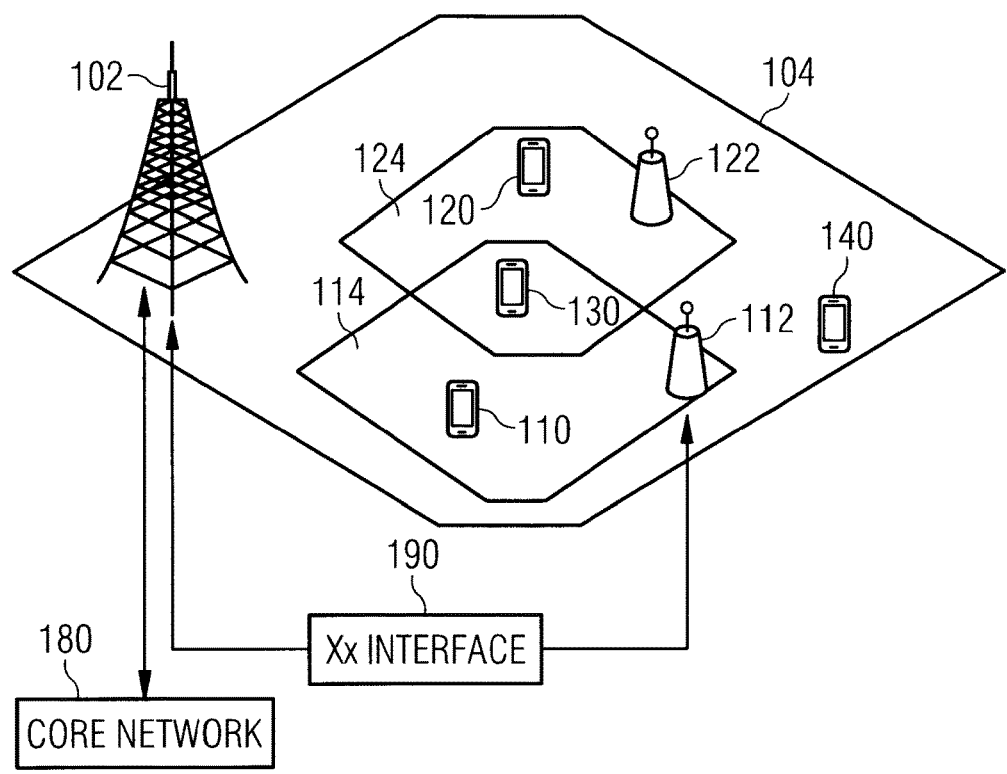
FIG. 1 illustrates an example communication system to which embodiments of the invention may be applied.

FIG. 1 illustrates example of a radio system (also referred to as a cellular communication system) to which embodiments of the invention may be applied. Radio communication networks (also referred to as cellular communication networks), such as the Long Term Evolution (LTE), the LTE-Advanced (LTE-A) of the $3^{rd}$ Generation Partnership Project (3GPP), or the predicted 5G solutions, are typically composed of at least one network element, such as a network element 102, providing a cell 104. In the example of FIG. 1, cells 104, 114, 124 may be shown. The cell 114 may be provided by a network element 112, and the cell 124 may be provided by a network element 122, for example. The cell 104 may be provided by the network element 102. It is, however, possible that a network element of the radio system may provide more than one cell. Thus, for example, the network element 102 may provide the cell 104, the cell 114, and/or the cell 124 at least in some implementations. In general, the system may comprise one or more network elements 102, 112, 122, wherein each network element provides one or more cells 104, 114, 124 providing service to one or more terminal devices 110, 120, 130, 140 in the cells.

Each cell of the radio communication network may be, e.g., a macro cell, a micro cell, a femto, or a pico-cell, for example, meaning that there may be one or more of each of the described cells. Each network element of the radio communication network, such as the network elements 102, 112, 122, may be an evolved Node B (eNB) as in the LTE and LTE-A, a radio network controller (RNC) as in the UMTS, a base station controller (BSC) as in the GSM/ GERAN, Access Point (AP), 5G base station or controller, or any other apparatus capable of controlling radio communication and managing radio resources within a cell. That is, there may be one or more of each of the described apparatuses or entities. To give couple of examples, the network element 102 may be an eNB, for example. The network element 112 may also be an eNB. For example, network element 102 may provide a macro cell and the network element 112 may provide a micro cell.

The cells 114, 124 may also be referred to as sub-cells or local area cells, for example. The network elements 112, 122 may be referred to as sub-network elements or local area access nodes, for example. The cell 104 may be referred also to as a macro cell, for example. The network element 102 may be referred to as a macro network element, for example. In an embodiment, the local area access nodes are network elements similar to the network element 102. Thus, for example, the local area access node 112 may be an eNB or a macro eNB. The cells 104, 114, 124 may provide service for at least one terminal device 110, 120, 130, 140, wherein the at least one terminal device 110, 120, 130, 140 may be located within or comprised in at least one of the cells 104, 114, 124. The at least one terminal device 110, 120, 130, 140 may communicate with the network elements 102, 112, 122 using communication link(s), which may be understood as communication link(s) for end-to-end communication, wherein source device transmits data to the destination device. It needs to be understood that the cells 104, 114, 124 may provide service for a certain area, and thus the at least one terminal device 110, 120, 130, 140 may need to be within said area in order to be able to use said service (horizontally and/or vertically). For example, a third terminal device 130 may be able to use service provided by the cells 104, 114, 124. On the other hand, fourth terminal device 140 may be able to use only service of the cell 104, for example.

The cells 104, 114, 124 may be at least partially overlapping with each other. Thus, the at least one terminal device 110, 120, 130, 140 may be enabled to use service of more than one cell at a time. For example, the sub-cells 114, 124 may be small cells that are associated with the macro cell 104. This may mean that the network element 102 (e.g. macro network element 102) may at least partially control the network elements 112, 122 (e.g. local area access nodes). For example, the macro network element 102 may cause the local area access nodes 112, 122 to transmit data to the at least one terminal device 110, 120, 130, 140. It may also be possible to receive data, by the network element 102, from the at least one terminal device 110, 120, 130, 140 via the network elements 112, 122. To further explain the scenario, the cells 114, 124 may be at least partially within the cell 104.

In an embodiment, the at least one terminal device 110, 120, 130, 140 is able to communicate with other similar devices via the network element 102 and/or the local area access nodes 112, 122. For example, a first terminal device 110 may transmit data via the network element 102 to a third terminal device 130. The other devices may be within the cell 104 and/or may be within other cells provided by other network elements. The at least one terminal device 110, 120, 130, 140 may be stationary or on the move.

The at least one terminal device 110, 120, 130, 140 may comprise mobile phones, smart phones, tablet computers, laptops and other devices used for user communication with the radio communication network. These devices may provide further functionality compared to the Machine Type Communication (MTC) schema, such as communication link for voice, video and/or data transfer. However, it needs to be understood that the at least one terminal device 110, 120, 130, 140 may also comprise MTC capable devices, such as sensor devices, e.g. providing sensor data, such as position, acceleration and/or temperature data to name a few examples.

It is also noted that there may be different types of network elements providing services to terminal device(s). For example, a home gateway/base station or a highway gateway/base station may be used in such systems to increase coverage and/or capacity. For example, the small network nodes 112, 122 (e.g. micro, nano and/or femto cell providers) may be such gateways/base stations.

For 5G solutions, the implementation may be similar to LTE-A, as described above. The network elements 102, 112, 122 may be base station(s) or a small base station(s), for example. In the case of multiple eNBs in the communication network, the eNBs may be connected to each other via an Xx interface 190. For example, the Xx interface 190 may be an X2 interface as specified in the LTE. Example of this may be shown in FIG. 1, wherein the network element 112 may be shown to be connected to the network element 102 via the Xx interface 190. Other communication methods between the network elements may also be possible. For example, APs of WLAN system may communicate with each other. In general, the network elements of FIG. 1 may be communicatively connected (wireless and/or wired) to each other using one or more circuitries. The Xx interface 190 is one example of how to realize such communication.

At least some of the network elements 102, 112, 122 may be connected via an S1 interface or any similar interface(s) to an evolved packet core, more specifically to a mobility management entity (MME) and to a system architecture evolution gateway (SAE-GW). In the example of FIG. 1, network element 102 is shown to be connected to a core network 180 comprising, for example, the evolved packet core. In general, the network element 102, 112, 122 may be communicatively connected to the core network. For example, this may mean that the network element 102, 112, 122 may communicate with Network Management System (s) (NMS). Similarly, it may be possible that the one or more user devices, terminal devices, or client devices 110, 120, 130, 140 are communicatively coupled with the NMS or a similar system. The NMS may refer to an entity or entities which may be configured to obtain management plane data from one or more devices of the system. Management plane may be a sub-plane of the control plane used in such systems. Control plane, in general, may be used for control signaling whereas data plane may be used to provide user related data. Management plane data may refer to data that is associated with the management plane measurement data, Key Performance Indicator(s) (KPI) and/or counter(s), for example. Thus, management plane data may comprise one or more performance indicator each comprising one or more data points or values. For example, a network element or a device may acquire and/or measure the one or more performance indicators. The acquiring and/or measuring may be performed constantly, periodically and/or within a certain time. Hence, the network device may gather one or more values or data points of each performance indicator. Accordingly, the network device may transmit these values to the NMS, for example.

Figure 2:
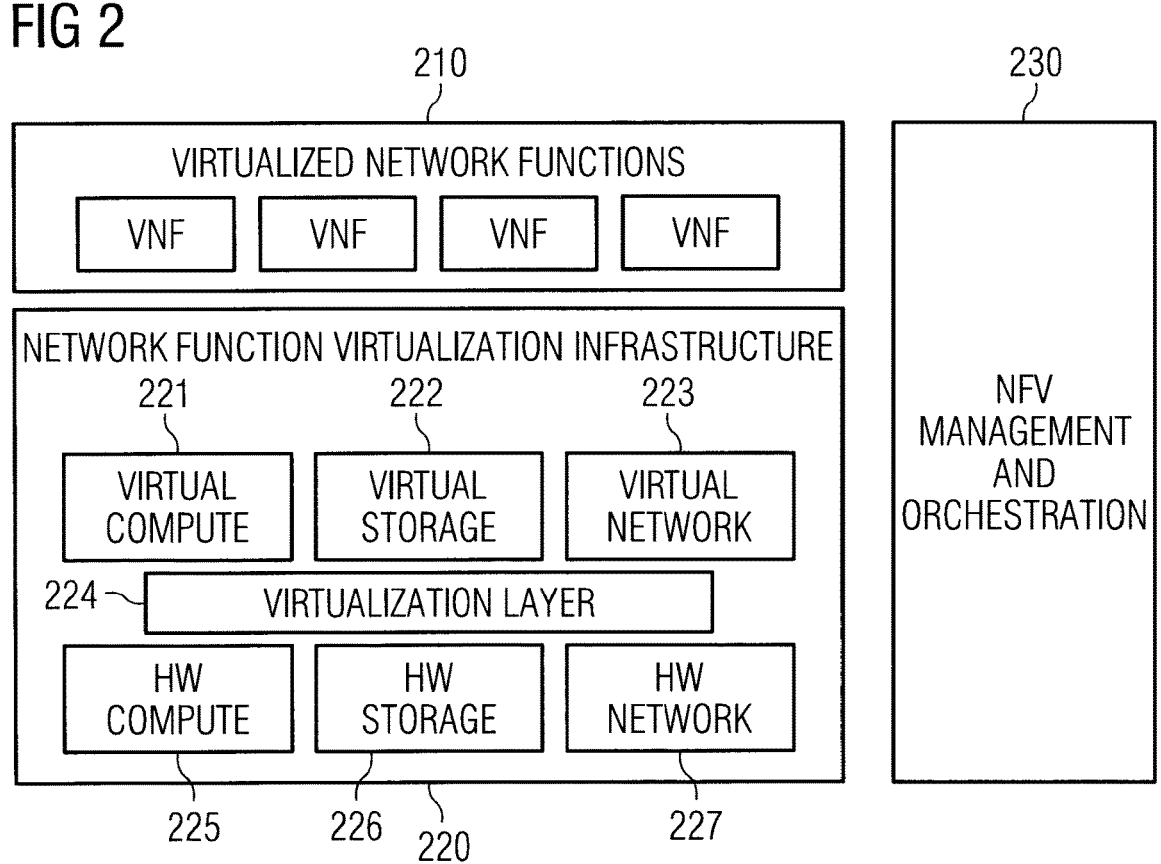
FIG. 2 illustrates an example system that utilizes virtualized network functions.

The radio system of FIG. 1 may be configured to provide one or more Virtual Network Functions (VNFs) 210 as shown in the example of FIG. 2. This may mean that at least some of the functions provided by the radio system are virtualized. It may be that some functions are provided directly by physical entities and some are virtualized or that all network functions are virtualized. Examples of VNFs may comprise firewall function, antivirus function, video optimizer function, parental control function, router function, Internet Protocol Security (IPS), Radio Network Controller (RNC), or Evolved Packet Core (EPC), to name only a few examples. In general, if for example a router function is normally provided by physical entity, it may be virtualized and thus the router function may become a VNF, i.e. router VNF.

Referring to FIG. 2, the virtualization may work such that physical hardware resources 225-227 comprising one or more hardware computing entities (e.g. processors, servers), one or more hardware storages (e.g. databases) and one or more hardware network resources (e.g. radio interfaces, wiring) are virtualized via virtualization layer 224. The virtualization layer 224 may be responsible of abstracting the physical resources provided by the hardware layer 225-227 into virtual resources 221-223 of the network function virtualization infrastructure 220. The VNFs 210 may utilize the virtual resources 221-223 to provide needed functionalities. Virtualization provides benefits, for example, as the virtual resources 221-223 may be scaled using the hardware resources 225-227. For example, more hardware resources may be dynamically allocated for the virtual entities if a need arises. Similarly, hardware resources may be used for some other purpose when, for example, network load is lower.

The virtualization of network functions may also utilize a specific Network Function Virtualization (NFV) management and orchestration entity 230 that may be responsible for controlling the VNFs 210. For example, the NFV management and orchestration entity 230 may create VNFs or control how different VNFs work. Further the NFV management and orchestration entity 230 may control the virtualization of the hardware resources 225-227 into the virtual resources 221-223 via the virtualization layer 224. Thus, for example, the NFV management and orchestration entity 230 may allocate further hardware resources 225-227 to the virtual layer 221-223 if needed and available. It is also noted that systems like shown in FIG. 1 may rely both on physical network elements and virtualized network elements. However, it is expected that the virtualization increases in 5G networks.

Getting back to generally the 5G systems, two main promises of 5G networks are ultra-low latencies and high throughput to end user. Both promises may cause increased number of scattered Network Elements (NEs) and functions compared with prior network generations. Ultra-Low latency promise may be achieved through distributed user plane and control plane with virtualized core elements and functions placed more close to Radio Access Network (RAN) elements which may increase number of places, where core functions are executed. High throughput to end user promise may be realized by utilizing unused radio frequencies (e.g. centimetre and millimetre waves) in the available spectrum. This may require more 5G RAN elements to cover given area than were used in prior technology generations, which may further increase the number of elements in the network. On the other hand, due to investment and user retention issues, old generation Network Elements (NEs) may not be completely scrapped off resulting in overall huge number of NEs in the network.

Increased number of network elements and functions may produce huge amount of Management Plane (M-Plane) data making it Big Data for the telecommunication companies and operators. Conventional centralized Network Management Systems (NMS) may face fundamental scaling challenges in managing this Big Data, be it its collection, storage or quick analysis. In normal operations, major part of this data may be redundant or changes by a very small amount and/or is of lesser interest to the operator. Furthermore, there may be various small Internet of Things (IoT) style gadgets (e.g. MTC devices explained above) or auxiliary network elements and/or functions which may be of lesser interest to the operator(s). This less important data from least important network elements may still be collected and stored by NMS with the same priority as the data from the more critical network elements. This least significant data may constitute significant part of M-Plane data.

Hence, there is provided a solution to reduce the amount of M-plane data transferred in the communication system (e.g. in the system of FIG. 1 and/or 2). At the moment, there is no mechanism used to remove these redundancies/small deviations from the data and assign different priority for collection and storage of M-Plane data from different network elements. Instead, the provided solution relates to compression of data. However, although compression may be used to decrease size of collected and/or stored data, it may require that the data is gathered before it is compressed and subsequently transmitted. Hence, this may significantly increase delay in providing the collected data which is an undesired feature). Thus, increasing latency and/or delay may not be a suitable option to decrease M-Plane data. On the other hand, decompression may be impossible to continue if some part of the compressed data is lost. Also, (de)compression may require lot of processing capacity and thus consume valuable resources. Furthermore, compression may not be efficient to be performed for a small data set (e.g. 1-3 data points) as it may in fact increase the data amount in such cases (e.g. 1 data point). Last but not least, used compression techniques are not able to remove redundant transfers of M-Plane data. Therefore, there seems to be a need to provide novel solutions to solve at least some of the indicated problems that are present with the compression method(s).

Figure 3:
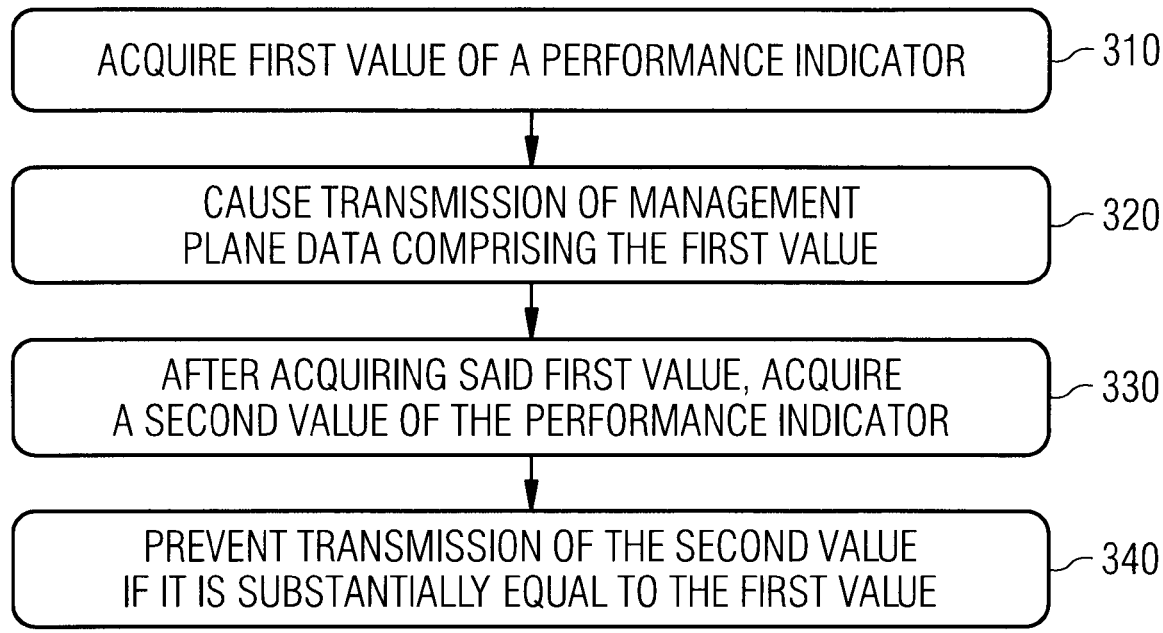
FIGS. 3 and 4 illustrate flow diagrams according to some embodiments.
Figure 4:
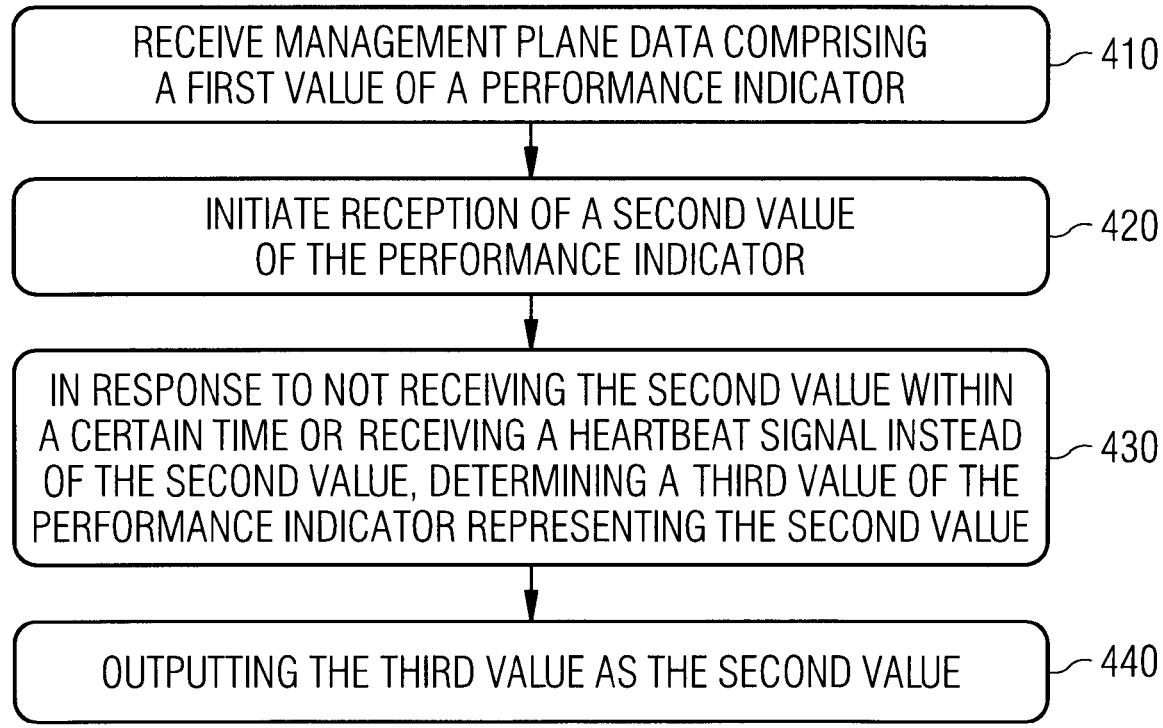

FIGS. 3 and 4 illustrate flow diagrams according to some embodiments. Referring first to FIG. 3, a method in a first device of a cellular communication system (e.g. system of FIG. 1 and/or 2) is shown, the method comprising: acquiring a first value of a performance indicator (block 310); causing a transmission of management plane performance data to a second device of the cellular communication system, said performance data comprising said first value (block 320); after acquiring said first value, acquiring a second value of the performance indicator (block 330); and preventing a transmission of the second value if the second value is substantially equal to the first value (block 340).

Referring now to FIG. 4, a method in a second device of a cellular communication system (e.g. system of FIG. 1 and/or 2) is shown, the method comprising: receiving management plane performance data from a first device of the cellular communication system, said performance data comprising a first value of a performance indicator acquired by the first device (block 410); initiating reception of a second value of the performance indicator from the first device (block 420); in response to not receiving said second value within a certain time from receiving the first value or receiving a heartbeat signal instead of the second value from the first device, determining, based at least on the previously received first value, a third value of the performance indicator representing said second value (block 430); and outputting said third value as the second value in response to the determining (block 440).

The first device described with respect to FIGS. 3 and 4 may be or be comprised in a network element (e.g. network element 102, 112, 122, i.e. a network node, such as a base station or a controller), and/or a user device 110, 120, 130, 140, for example. The second device described with respect to FIGS. 3 and 4 may be or be comprised in a network element of the system. For example, the second device may be or be comprised in the NMS. Thus, the second device may be a part of the NMS, wherein the second device is configured to acquire and/or store the management plane data from one or more network elements of the system. The system is now described in more detail with reference to further Figures. It needs to be noted that reference is made to first and second devices which need to be understood broadly as described above.

In an embodiment, the first value is the first measured and/or acquired value of the performance indicator. Hence, the first device may be configured to transmit the first acquired value and then determine whether or not to transmit further value(s). It is also noted that in the present solution, the acquired and/or measured values of the performance indicator may be continuously transmitted if the described conditions are met. That is, once an indicator value point is acquired the first device may determine whether or not to transmit said value point (i.e. value) to the second device. The first device may transmit the value point if it is the first value point measured for said indicator, or if said value point is not the first value point but a subsequent value point but fulfils criteria described for the determination (i.e. one is that redundant values may not be transmitted).

Figure 5A:
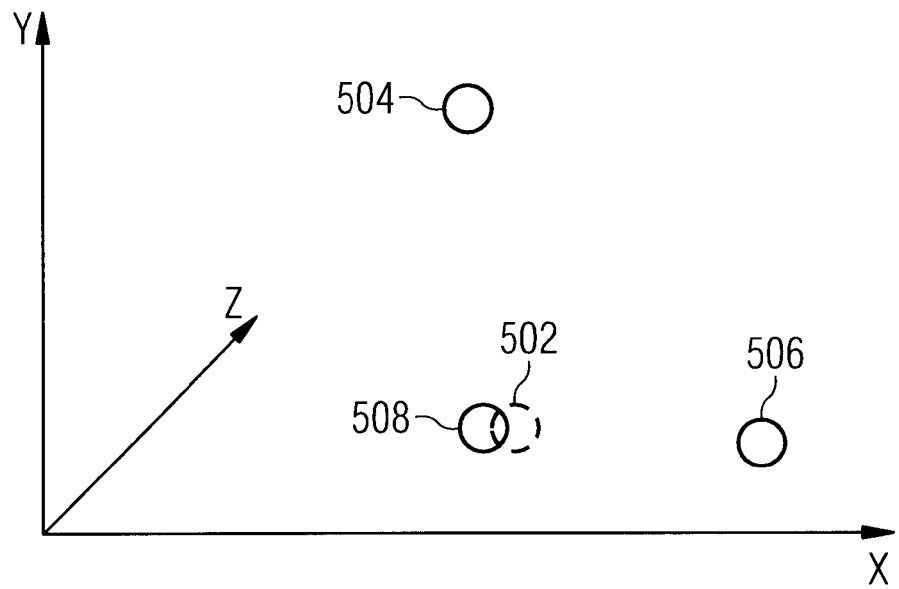
FIGS. 5A-5H illustrate some embodiments.

FIGS. 5A to 5H illustrate some embodiments of the system. Referring first to FIG. 5A, a multidimensional value range may be shown. The FIG. 5A may represent a three dimensional graph, but it is noted that the management plane performance indicator values may be multidimensional in the sense that they may have more than three dimensions. However, to simplify presentation, only three dimensions are shown. The presented three dimensional graph may have three axis: X, Y, and Z. The axis may be orthogonal to each other. In the graph, as an example, four value points or values 502, 504, 506, 508 of a performance indicator are illustrated. As discussed, the performance indicator may be measured and/or acquired by the first device of the system.

Value 502 and value 508 may be substantially same or the same. In such case, the first device may determine not to transmit the other value. For example, if value 508 is acquired and/or measured consecutive to acquiring and/or measuring value 502, the value 508 may not be transmitted as a result of the determination (i.e. prevent the transmission of the value 508). The receiving device (e.g. second device) may then determine the value 508 based at least on received value 502. For example, the value 508 (e.g. second value) may be determined, by the second device, to be equal to value 502 (e.g. first value) as the value 508 was never received. Equal size in FIG. 5A may mean that the values 502, 508 have substantially same X, Y, Z coordinates, for example.

On the other hand, there may be values which are not of equal size, e.g. values 504 and 506 compared with each other and also compared to values 502, 508. At least value 504 may be situated on a different spot on Y axis compared with values 502, 506, and 508. Similarly, at least value 506 may be situated on a different spot on X axis compared with values 502, 504, and 508. Hence, values 504, 506 may be of different size compared with value 502. So, if the value 504 or 506 is acquired and/or measured consecutively (i.e. next measurement after measuring value 502 so that there are no other values of the same indicator measured in-between), the value 504, 506 may be transmitted by the first device to the second device. This may be performed because the consecutively acquired value (e.g. value 504 or 506) may be substantially of unequal size compared with the previously acquire value 502.

Figure 5B:
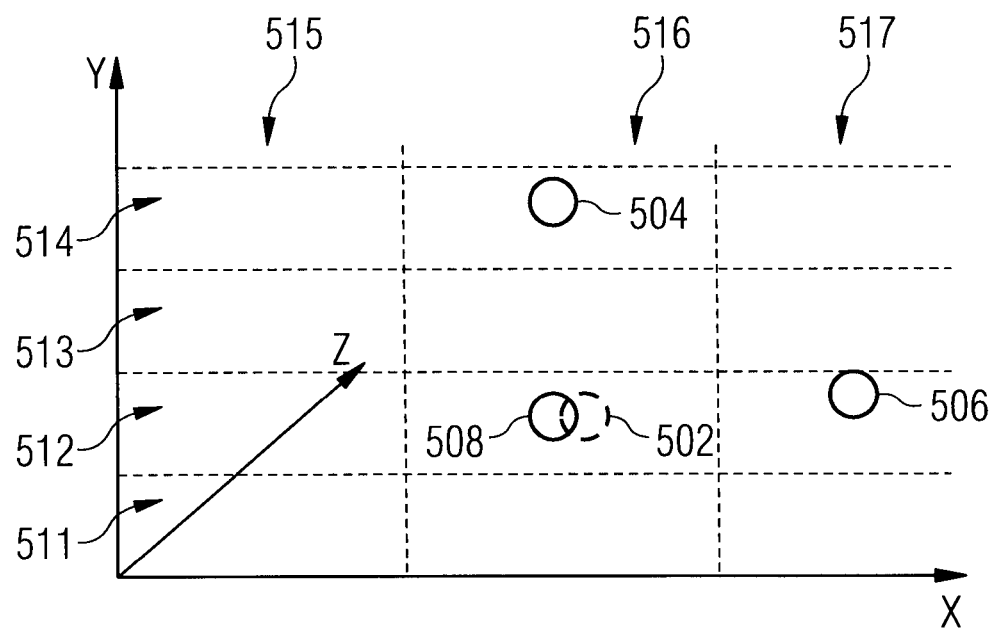

Referring to FIG. 5B, the first device is configured to prevent the transmission of a second value (i.e. consecutively acquired/measured value) if the first (i.e. previously acquired/measured value) and second values are situated within a same value range amongst a plurality of contiguous value ranges 511-517. Otherwise the first device may cause the transmission of the second value to the second device (i.e. if the second value is situated within a different value range). In FIG. 5B, each of the ranges 511-517 may individually form a value range. That is, range 511 may form a value range that defines value boundaries on Y axis, but covers all of axis X and Z, for example. On the other hand, certain value ranges may define a two-dimensional or three-dimensional value range (i.e. defining boundaries on two or more axis). Hence, the value ranges 511-517 may be multidimensional or two-dimensional, for example.

In the example of FIG. 5B, values 502, 506, 508 may be situated within a same value range 512, values 502, 504, 508 may be situated within a same value range 516, and values 502, 508 may be situated within a same value range 512, 516. So, according to some embodiments, the consecutively acquired (acquiring may comprise measuring in the context of the present solution) values may be mapped to have the same value as a previously acquired value, if the previously acquired value is situated within or in the same value range as the consecutively acquired value. Depending on how the value range is defined, the consecutively acquired value is either transmitted or not transmitted by the first device. To further explain the situation, X-axis may, for example, represent time. Hence, value 506 may be situated within the same value range on Y-axis (and possibly also on Z-axis) as values 502, 508. In such case, the value 506 may be of equal size compared with value 502, 508, but acquired at different time instant. For example, Y may denote Radio Signal Strength Indicator (RSSI). For example, FIGS. 5A and 5B may illustrate values 502-508 as two-dimensional values in function of time. However, it may be equally possible that the three axis each represent a value dimension and time is not included at all.

Figure 5C:
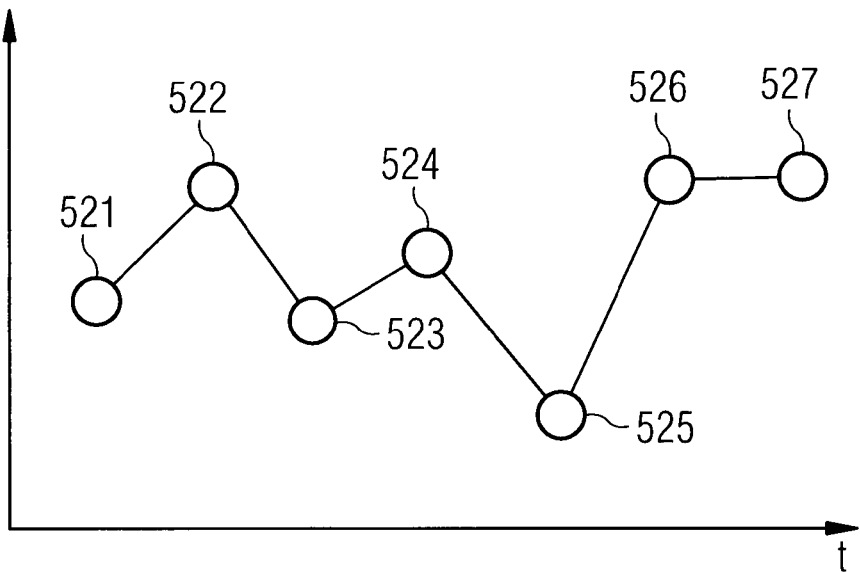

Referring to FIG. 5C, a simplified graph is presented showing a performance indicator 590 as function of time. As discussed, the present solution may be applicable to multi-dimensional values, but for illustration purposes the solution is now discussed in simpler terms. Values 521-527 may be values of the performance indicator 590 acquired, by the first device, at different time instants. In the example, consecutive values 521-525 seem to be substantially of different size. For example, value 522 consecutive to value 521 may be of different size compared with value 521. Similarly, value 523 consecutive to value 522 may be of different size compared with value 522. It needs to be noted that a consecutive value may refer to the previously acquired value, and thus, at least in some cases, it does not refer to any of the value that were acquired before the previously acquired value. For example, value 523 may not be consecutive to value 521 although value 523 may be subsequent to value 521. Hence, although value 523 may have substantially equal value with 521, it may be transmitted as value 521 only if value 522 has also been mapped to the value 521. In some cases, the value 523 is transmitted as value 522.

According to an embodiment, the value ranges (e.g. value range formed by ranges 511-514 of FIG. 5B) are contiguous value ranges. Example of this can be seen in FIG. 5D, wherein three contiguous value ranges 532, 534, 536 are shown. The contiguous value ranges 532, 534, 536 may define ranges for the performance indicator 590. It may be possible that the first device applies different ranges for different performance indicators. The ranges may be configured by the communication network (e.g. cellular network) to the first device. For example, the second device may use control signaling to configure the contiguous value ranges 532, 534, 536 and/or ranges to the first device. Similarly, some other network device may configure the first device and/or some other devices similar to the first device (i.e. needs to collect and transmit M-plane data).

In an embodiment, each of the plurality of contiguous value ranges 532, 534, 536 are substantially of equal size. At least in some embodiments, the ranges 532, 534, 536 may be exactly of equal size. Similar logic may apply to the more general value range. That is, each of the plurality of contiguous value ranges may substantially or exactly of equal size. As discussed previously, the configuration of the ranges may be performed via network signaling and/or the first device may determine the ranges itself. Also, it may be possible that the ranges or ranges are preconfigured to the first device. However, it is appreciated that the present disclosure is not limited to such an embodiment.

Figure 5D:
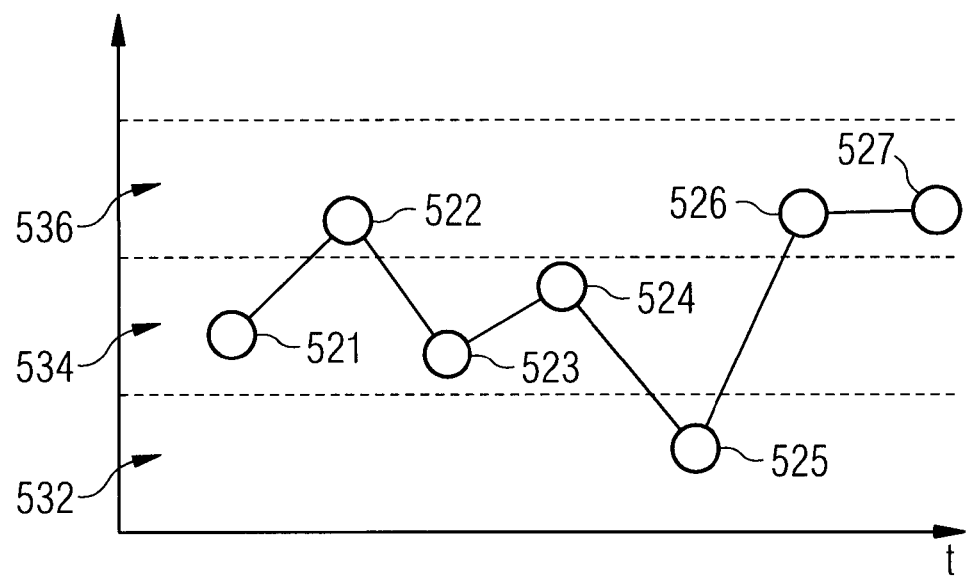

Referring still to FIG. 5D, values 521 and 522 may be situated within different ranges, i.e., value 521 within value range 534 and value 522 within value range 536. Hence, both values may be transmitted by the first device in the embodiments utilizing the value range determination as the ranges may be different to each other. On the other hand, values 523 and 524 may be situated within the same value range 534, and thus value 524 may not be transmitted, by the first device, to save resources of the system. The second device (i.e. the receiver) may assume that value 524 equals to value 523. Although said values are a little bit different, the end result may be sufficient. It may also be apparent that by reducing the size of the ranges 532, 534, 536, the accuracy of the determination by the second device may be enhanced. So, at least in some embodiment, the second device may determine that the value 524, not transmitted by the first device and thus not received by the second device, may be equal to the previously transmitted value 523. This logic may apply also to values 526, 527, wherein value 527 may not be transmitted because it is substantially equal to value 526 and/or it is situated within the same value range 536 as value 526.

FIG. 7 illustrates a signaling diagram according to an embodiment. Referring to FIG. 7, the first device 710 (i.e. first device described as the M-plane data provider in the examples and embodiments above) may receive control signal(s) and/or message(s) from a network element of the communication system (block 732). In one example, the control signal(s) and/or message(s) are transmitted by the second device 720 (i.e. the second device described as the M-plane data receiver in the examples and embodiments above) to the first device 710. The control signaling (block 732) may cause configuration of the first device 710 (block 734). That is, control signaling may be used by a network element to configure the first device 710 to prevent the transmission of a second value of a performance indicator if said second value is substantially equal to the first value of the performance indicator. The second value may refer to a consecutive value of the first value (e.g. value 522 is the second value and value 512 is the first value). Additionally or alternatively, the configuration may cause the first device 710 to prevent the transmission of said second value if the first and second values are situated on the same value range amongst a plurality of contiguous value ranges 532, 534, 536. Value ranges of any one of the above-described embodiments may be employed here.

In an embodiment, the control signaling (block 732) indicates the plurality of contiguous value ranges 532, 534, 536 for one or more performance indicators. That is, same value ranges may be indicated to more than one performance indicator. It is also possible that the control signaling configures different value ranges for different performance indicators. Hence, the first device 710 may apply different rule(s) or criterion when deciding whether or not to transmit a certain value of a certain indicator amongst a plurality of indicators.

For example, the control signaling may define or indicate one or more performance indicators that the first device needs to measure and/or monitor. For example, the control signaling may indicate which of the indicator(s) is less critical and which are more critical. Hence, the control signaling may classify different indicators, wherein different criterion may apply to different classes. For example, indicators in a first class (e.g. class 0) may be associated with a first set of rules. For example, indicators in a second class (e.g. class 1) may be associated with a second set of rules. For example, indicators in a third class (e.g. class 2) may be associated with a third set of rules. There may be more than three classes used in the system. The first device 710 may apply these classes and the associated rules when determining whether or not to transmit a certain value. The classes may be referred to as Quality of Monitoring (QoM) classes.

For example, $QoM_0$ may denote the first class (i.e. class 0), $QoM_1$ may denote the second class (i.e. class 1), and $QoM_2$ may denote the third class (i.e. class 2), and so forth. For example, for indicators in the first class, the first device may be configured to apply first set of rules, wherein the first set of rules cause the first device to determine whether a value of an indicator is equal to a previously acquired value of said indicator. That is, based on the first set of rules, the first device 710 may perform functions of block 340 of FIG. 3. So, the first set of rules may be applied to all indicator(s) in the first class (e.g. $QoM_0$). In an embodiment, the second set of rules (i.e. class 1 or $QoM_1$) causes the first device 710 to prevent the transmission of a value of an indicator if the previously acquired value of the indicator and said consecutive value are within same value range (e.g. same value range). Similarly, each further class 2 to N (where N may denote positive integer values starting) may be associated with a class specific set of rules. For example, further set of rules may have differently configured value ranges or ranges, as will be discussed later in more detail. Each class may comprise or be associated with one or more indicators. Hence, the first device may deal with values of different indicators according to different set of rules.

Referring still to FIG. 7, the first device 710 may transmit (e.g. after the configuration of one or more classes) first value of a performance indicator to the second device 720 (block 736). The second device 720 may output said value (block 737). Outputting may comprise, for example, further transmitting the value to some other network entity, processing the value or values and transmitting a message to a network entity based on said processing, storing said value into a database, and/or processing said value(s) and storing a processed value into the database.

In block 738, the first device 710 may acquire a second value of said indicator, the second value being consecutive to the first value. Depending on determination and/or class of said indicator, the first device 710 may either prevent transmission of the second value or transmit said second value (block 740).

In an embodiment, in response to preventing the transmission of a certain number of successively or consecutively acquired performance indicator values, the first device 710 causes transmission of a heartbeat signal to the second device 720 (block 740). So instead of transmitting the second value (e.g. if it is the same as the previous value or if it is within the same value range as the previous value), the heartbeat signal may be transmitted by the first device 710 to the second device 720. In an embodiment, said certain number of successive or consecutive values equals to 1. So, the heartbeat signal may be transmitted each time instead of a value of an indicator that is prevented to be transmitted. In some cases, said certain number equals to 2, 3, 4, 5, 6, 7, 8, 9, 10, 50, or 100. It may be beneficial to increase the number from 1 so that the transmissions by the first device 710 may be decreased. Giving one example, with reference to FIG. 5F, values 543, 544, 545 may be situated within same value range 552. Hence, values 544, 545 may not be transmitted at least in some embodiments. However, depending on the configuration, the first device 710 may transmit a heartbeat signal instead of transmitting the value 544 and transmit another heartbeat signal instead of transmitting the value 545, transmit a heartbeat signal instead of transmitting the value 545 (i.e. after at least two not transmitted values), or not transmit a heartbeat signal at all. The heartbeat signal may be transmitted so that the second device 720 may be aware that a transmission of an indicator value, by the first device 710, has not failed, for example.

Referring again to FIG. 7, in block 741, the second device 720 may determine the second value based on either the transmitted, by the first device 710, second value or based on previously transmitted value or values. In a sense, the second device 720 may determine a third value in response to not receiving the second value or in response to receiving a heartbeat signal, wherein the third value represent the second value and may be determined on the basis of the first value. As in block 737, in block 743 the second device 720 may output the second value or the third value that represent the second value.

In an embodiment, if a value of an indicator is not transmitted (e.g. second value), the second device 720 is configured not to determine the second value or some other value representing the second value. Hence, the second device 720 may be configured to output only values that it has actually acquired or received.

The described classes may set the general level of variation in consequent values that may not be sent. In other words, QoM classes may specify quality by which M-Plane data could be collected from network element or a network function (e.g. VNF). That quality implies amount of relative information loss acceptable in collecting M-Plane data from the elements characterized with that class. As a reward, the M-Plane data can be compressed with this information loss at the mobile edge. Small compromise with information loss while collecting performance measurement data may further lead to significant reduction in transfer of M-Plane data. Compressed M-Plane data may thus reduce its collection, transmission and storage complexities. From the element characterized by the first class, $QoM_0$, all information may be collected. Only those consequent values that substantially or exactly equal to the previous sent value may be omitted. After that, each QoM class $QoM_1$, $QoM_2$, $QoM_N$ may omit more and more of least significant information contents.

In an embodiment, the first device 710 is configured to apply only one set of rules. That is, the first device 710 may be configured to regard all performance indicators as belonging to a certain class. For example, the first device 710 may be configured to determine whether or not to transmit a value of a indicator on the basis of a certain set of rules, wherein the certain set of rules is associated with one of the classes (e.g. class $QoM_N$, where N may denote a positive integer value). Thus, the first device 710 and/or similar devices may be configured, by the network, to utilize a set of rules associated with a certain class to all monitored performance indicators (sometimes referred to as metrics). However, it is possible that the first device 710 or devices are configured to use different set of rules associated with different classes when determining whether or not to transmit a certain indicator value. That is, indicators may be grouped into different classes, for example.

Figure 5E:
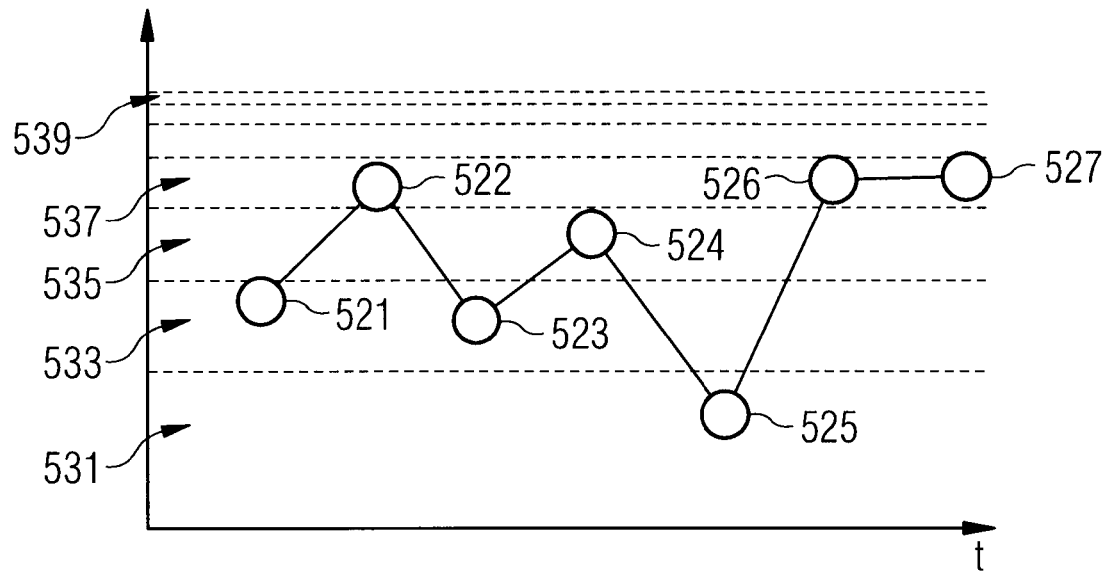
Figure 5F:
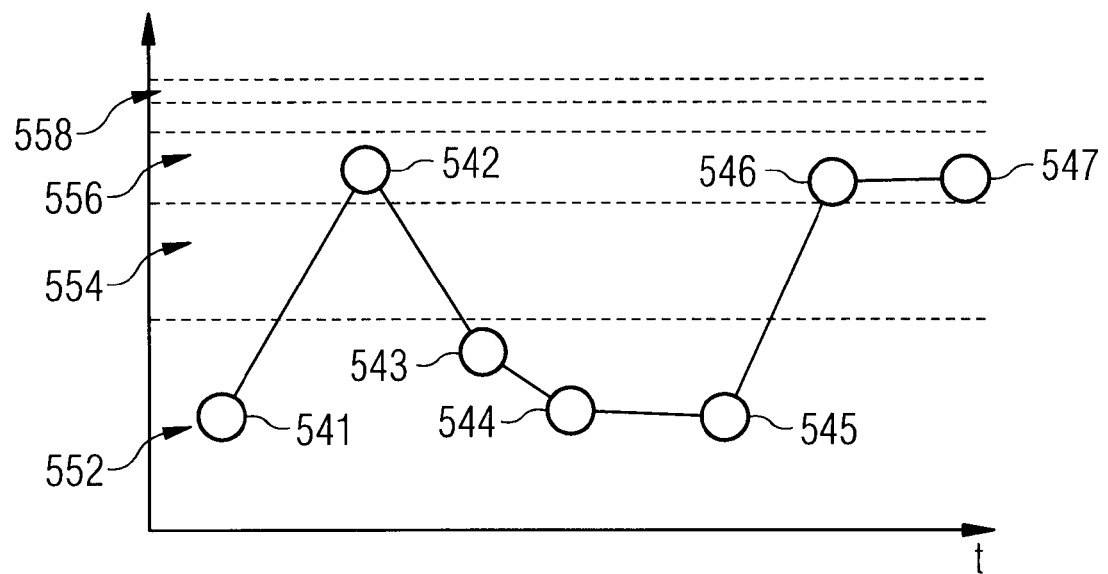

Let us now refer to FIGS. 5E and 5F, where FIG. 5E illustrates values of a first performance indicator 592 (sometimes referred to simply as an indicator) and FIG. 5F illustrates values of a second performance indicator 594. Both indicators may be monitored by the first device 710, for example. The indicators may sometimes be referred to as parameter, i.e. performance parameters. As explained, the network (e.g. second device 720) may configure the first device 710 to utilize different value ranges 531-539 and 552-558 for different performance indicators 592, 594. Thus, such control message may indicate a plurality of first contiguous value ranges associated 531-539 with the first performance indicator 592 and a plurality of second contiguous value ranges 552-558 associated with a second performance indicator 594. This may mean that transmission of values 541-547 may depend on a second set of rules (i.e. the value ranges 552-558) and that transmission of values 521-527 may depend on a first set of rules (i.e. the value ranges 531-539), wherein the sets of rules are different (i.e. value ranges are different). Value ranges here may be mutually contiguous value ranges.

At this point, it may be necessary to further explained what is meant by a contiguous value range. In order for a first value range 552 and second value range 554 to be contiguous, they may be situated adjacent to each other, i.e. bordering each other. So where the first value range 552 ends, the second value range 554 may continue. In such manner, the whole value range of a certain indicator may be divided into such contiguous subranges. For example, if the performance indicator's unit would be percent (%), and there would be four contiguous value ranges, it could mean that first value range would be from 0 to 25%, the second value range would be from 25% to 50%, the third value range would be from 50% to 75%, and finally the fourth value range would be from 75% to 100%. In such case the value ranges would be of equal size. However, they may also be of different size. Similar logic may apply to different performance indicators and their values.

According to an embodiment, the plurality of contiguous value ranges 531-539 and/or 552 to 558 increase or decrease according to a logarithmic function. Another example of this may be seen in FIG. 5F, where the value ranges 552-558 may follow a logarithmic function different from a logarithmic function of FIG. 5E. Decreasing according to a logarithmic function may mean that as the value of the indicator increases, the value ranges may become smaller. So, for example, value range 554 may be shorter or smaller than value range 552. It may also be that the decreasing follows some other function than a logarithmic function. In such case, the value ranges may be configured to decrease in length as the value of the indicator increases. So, in some embodiments, the value ranges decrease linearly, non-linearly, or are of equal size.

Related to this, the different classes may be defined as equation, mathematical model, function call with parameters, procedure call with parameters or using some other type of formalism. That is, the network may configure the first device 710 with the one or more classes by control signaling indicating, for example, the classes as models. Similarly, other type of configuration data may be shared, such as when to transmit the heartbeat signal and which indicators belong to which classes, to name a few examples.

According to an embodiment, in $QoM_0$ class accuracy level regarding loss of information is set to 0. This may mean that only consecutive redundant values are not transmitted. In $QoM_1$ class the accuracy level may be set to $25^{th}$ percentile of an absolute consecutive deviation of a history data set. The history data set may be collected by the first device 710 or some other device of the system and may be associated with a certain indicator. That is, the historic values of a performance indicator may be used to determine the $25^{th}$ percentile. Similarly, for example, $QoM_2$ class accuracy level may be set to $50^{th}$ percentile of the absolute consecutive deviation from the history data set. However, these should be understood as examples, and the actual determination may be different from these examples.

Figure 6B:
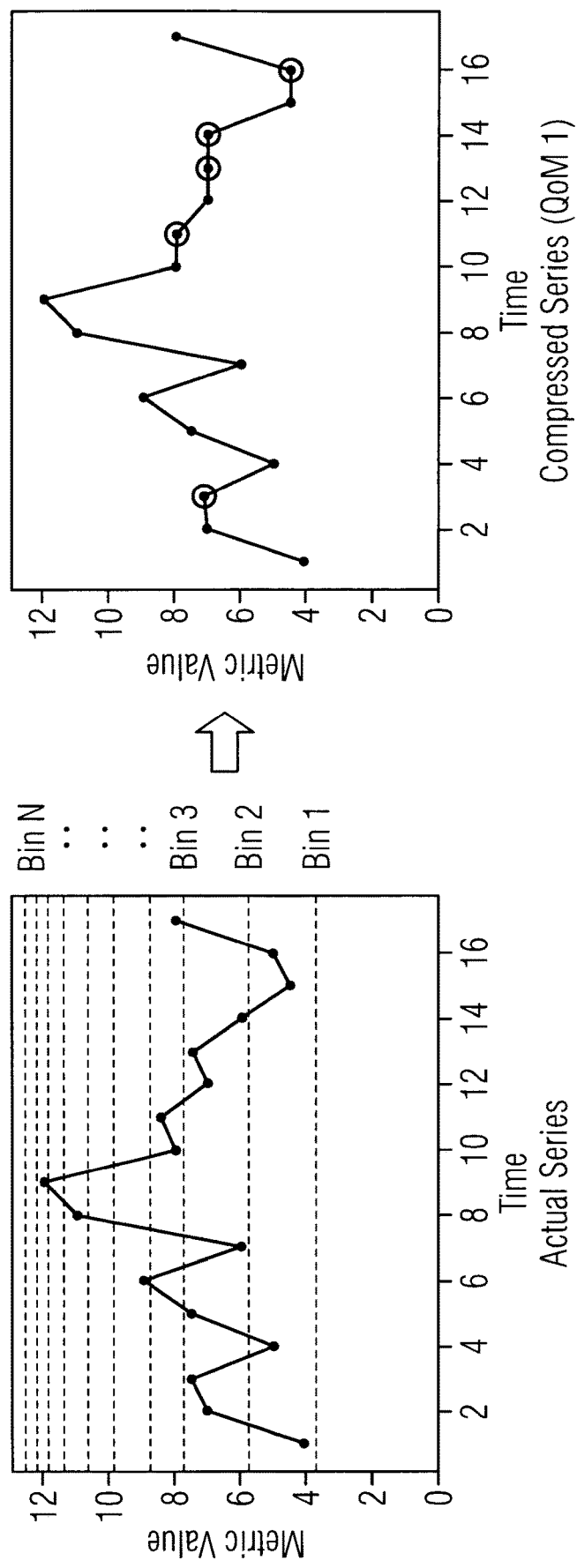
Figure 6C:
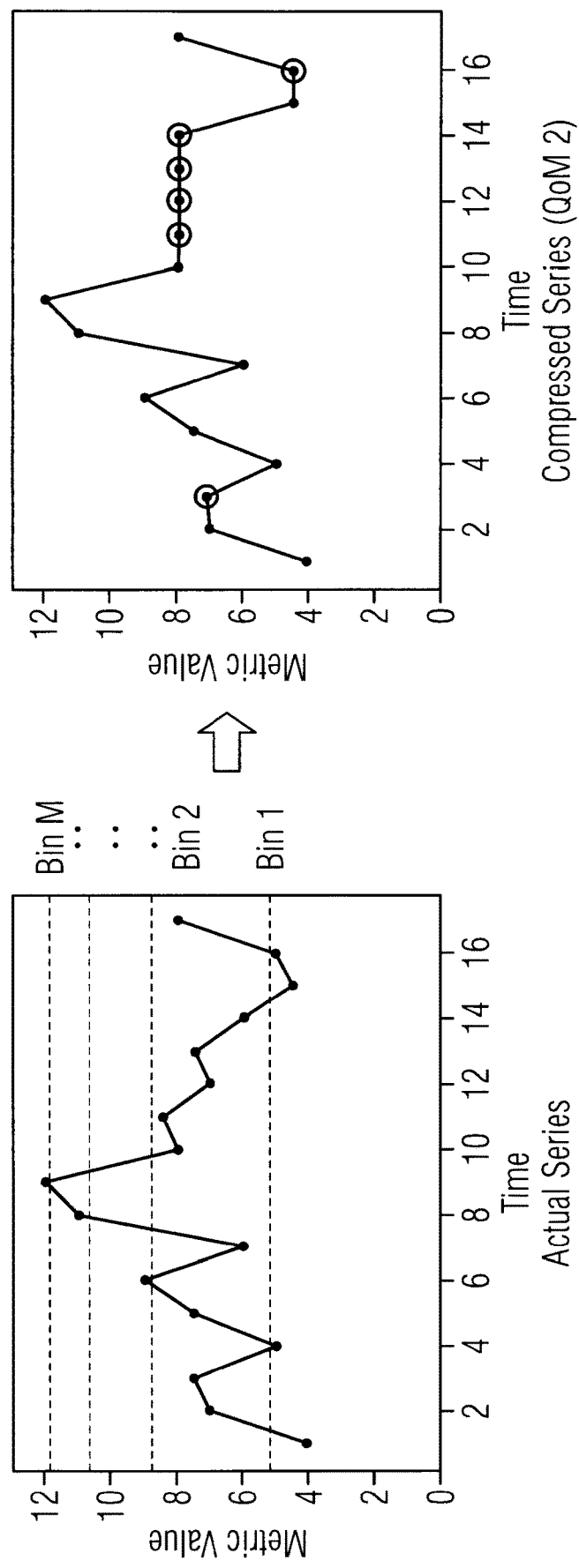

However, using this as an example, FIGS. 6A to 6C illustrate some embodiments as how a certain indicator may be dealt with, by the first device 710, using the different classes $QoM_0$, $QoM_1$, and $QoM_2$. Referring to FIG. 6A illustrating one embodiment, an original signal is shown on the left and a transferred signal (i.e. values transmitted by the first device 110) on the right, for different classes. Points without circle around them may denote value or value points which are transmitted and points with a circle around them may denote values which are not transmitted. From the element in the most accurate $QoM_0$ class, all the data points would be transferred as there are no repetitious consequent values. From the element in $QoM_1$, 11 values out of 17 (i.e. 65%) would be sent and from the element in $QoM_2$ 8 values out of 17 (i.e. 47%) would be sent.

A data point may be transmitted, if it is considered substantially different from a previously transmitted data point. And as described above, the transmission of the data point may be prevented, if the data point is considered substantially equal to the previously transmitted data point. In an embodiment, the substantially equal is defined by using a threshold indicating the highest allowable difference between the data point and the previously transmitted data point to prevent the transmission. The previously transmitted data point may also be called a reference data point for the threshold comparison. In other words, the threshold may define how close to the reference data point the data point has to be to be considered substantially equal to the reference data point. The threshold may be defined by a value d, and the transmission rule may be defined as:

1) if $|x_i - x_{i-k}| \leq d$, do not transmit $x_i$
2) if $|x_i - x_{i-k}| > d$, transmit xi and set xi as a new reference data point Above, $x_i$ is the current data point being evaluated, $x_{i-k}$ is the reference data point transmitted k data points before the $x_i$, and $|.|$ denotes an absolute value operation. As in the other embodiments, the reference point may be the data point that has been transmitted most recently. As described herein for the other embodiments, d may be defined separately for the different classes, and the value of d may be higher for a lower accuracy class. The first device 710 may receive the values of d from the second device 720 in step 732 of FIG. 7.

In another embodiment, preset value ranges may be employed, and the first device 710 may acquire the preset ranges from the second device 720 in step 732. Thereafter, the first device may use the preset value ranges in determining whether or not to transmit a data point. If the data point is in the same range as the previously transmitted data point, the transmission of the data point may be omitted. Otherwise, the data point may be transmitted. FIGS. 6B and 6C illustrate this embodiment based on preset value ranges for two classes $QoM_1$ and $QoM_2$. Applied set of rules for $QoM_1$ class (i.e. used value ranges) may be seen in FIG. 6B, and applied set of rules for $QoM_2$ class (i.e. used value ranges) may be seen in FIG. 6C. The number of classes may be higher, and one of the classes may be the above-described $QoM_0$.

In these three FIGS. 6A to 6C, it may be observed that as the size of the value ranges increases or number of value ranges decreases, less data points are transmitted as there are more consecutive values within the same range. The same principle is valid for the threshold: a greater value of the threshold leads to the transmission of a lower number of data points.

In an embodiment, the first device is configured to acquire a first value of the second performance indicator 594 having a lower priority than the first performance indicator 592; cause a transmission of the first value of the second performance indicator 594; after acquiring said first value of the second performance indicator, acquiring a second value of the second performance indicator 594; preventing a transmission of the second value of the second performance indicator 594, if the first and second values of the second performance indicator are situated on a same value range amongst a plurality of contiguous value ranges . For example, as can be seen in FIG. 5F, values 541 and 542 are situated in different value ranges. However, values 543, 544, and 545 are situated in the same value range 552. Hence, following the described logic, values 544, 545 would not be sent. Instead, a heartbeat signal may be sent if such a functionality is configured for the first device 710.

The different priority between the first indicator 592 and the second indicator 594 can be seen in FIGS. 5E and 5F as the value ranges 552-558 of the second performance indicator 594 are larger than the value ranges 531-539 of the first performance indicator 592. So, in one embodiment, the logarithmic function followed by the value ranges 531-539 is steeper compared with the logarithmic function followed by the value ranges 552-558.

In an embodiment, the transmission of the second value of the first performance indicator 592 is prevented if the first and second values of the first performance indicator 592 are situated on the same value range amongst a plurality of contiguous first value ranges. The transmission of the second value of the second performance indicator 594 is prevented if the first and second values of the second performance indicator 594 are situated on the same value range amongst a plurality of contiguous second value ranges, wherein a sizes of the first value ranges are smaller than respective sizes of the second value ranges. An example of this can be seen in FIGS. 5G and 5H where the value ranges 551 to 559 of the performance indicator 592 are smaller than value ranges 562 to 566 of the performance indicator 594. According to another perspective where the ranges are logarithmic, the size of the first value ranges decreases according to a first logarithmic function and the size of the second value ranges decreases according to a second logarithmic function, the first logarithmic function decreasing more steeply compared with the second logarithmic function. An example of this can be seen in FIGS. 5E and 5F where the size of the value ranges 531 to 539 of FIG. 5E experience a different, steeper descent than the size of the value ranges 552 to 559 of FIG. 5F. In these embodiments, the first performance indicator 592 may belong to $QoM_1$ class and the second performance indicator 594 may belong to $QoM_2$ class. It could be possible that there is a further performance indicator belonging to $QoM_0$ class, or that one or both of said first and second performance indicators belong to some other class.

Figure 5G:
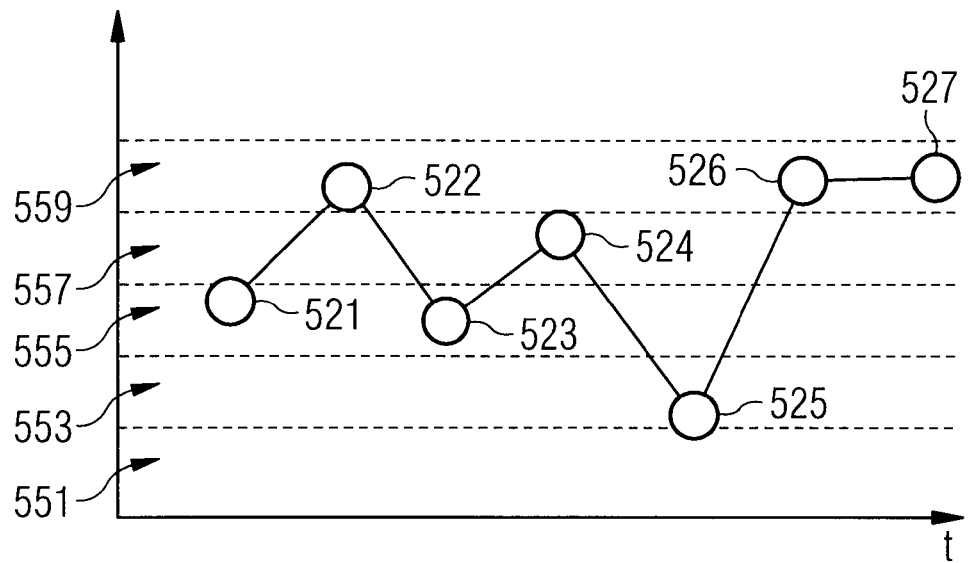
Figure 5H:
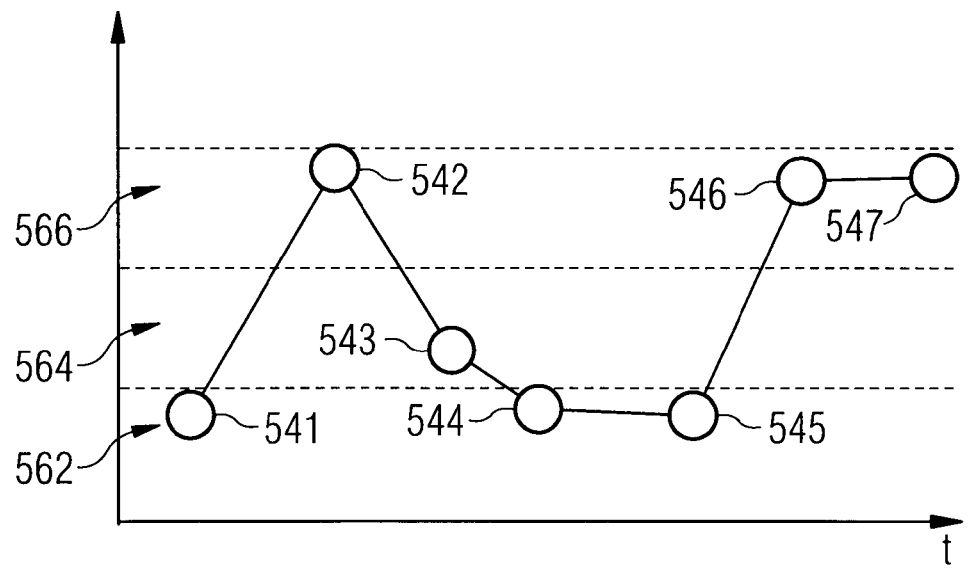

Although shown in FIGS. 5G and 5H, it is noted that the value ranges 551-559 may be of equal size compared with each other and value ranges 562-566 may be of equal size compared with each other. However, they may have different sizes compared with each other in another embodiment. Referring to FIG. 5G, the first device 710 may prevent transmission of value 527 as it is within the same range 559 as the previous value 526. Similarly, referring to FIG. 5H, the first device 710 may prevent transmission of value 545 and value 547 as they are situated within the same ranges as their previous values 544 and 546, respectively.

In an embodiment, the transmission of a second value is prevented by the device 710. For example, in FIG. 5F value 544 is not transmitted because the previous value 543 is within the same range 552 as the value 544. After acquiring said second value, the first device may acquire a third value 545 of the performance indicator; and prevent a transmission of the third value if the second and third values are situated on the same value range amongst the plurality of contiguous value ranges, otherwise the first device 710 may cause the transmission of the third value to the second device 720. In the embodiment of FIG. 5H, value 545 may not be transmitted, but the next value 546 may be transmitted, because it is mapped to a value range 566 different from a value range 562 of the value 545.

The proposed solution may provide different advantages which may include:
- Removes redundant data transfers.
- Helps differentiated monitoring of important and less important performance indicators, network elements, and network functions, which in turn may reduce M-Plane traffic.
- Reduced M-Plane data reduces resources needed to its collection, transmission, storage and processing. Reduced data transfers help in saving of archive side (NMS side) bandwidth, dedicated for collection of M-Plane data.
- Reduced data transfers reduce energy consumption.
- Reduction in M-Plane traffic could help existing NMS solution to serve upcoming 5G Networks without drastic Big Data framework upgrades, which seem otherwise inevitable.
- Enables faster data collection cycles.

One example of the advantages of using QoM classes for compression over traditional lossless compression techniques are quantitatively illustrated in Table 1 which shows sizes of data, compressed data and compression gains achieved by lossless compression techniques (zip & gzip), QoM compression, and their combinations. Compression gain in Table 1 is specified as the percentage whereas data sizes are given in bytes (B). Negative compression gain in first row depicts how lossless compression techniques (zip and gzip) actually increase the size of original file after addition of their respective headers when the data amount is small (e.g. 1 data point).

TABLE 1

Comparison between different compression techniques.

| KPI Data | ZIP | GZIP | QoM | QoM + ZIP | QoM + GZIP |
|---|---|---|---|---|---|
| 1 Data Point, 34 B | 146 B (−329%) | 61 B (−79%) | If data point sent: 34 B (0%) If data point not send 0 B (100%) | If data point sent: 146 B (−329%) If data point not send: 0 B (100%) | If data point sent: 61 B (−79%) If data point not send: 0 B (100%) |
| 20 Data Points (Redundant data values), 395 B | 248 B (37%) | 155 B (61%) | no information loss: 34 B (91%) | no information loss: 146 B (63%) | no information loss: 61 B (84%) |
| 20 Data Points (Random data values), 398 B | 256 B (36%) | 197 B (50%) | no information loss 317 B (20%) 10% information loss 168 B (58%) | no information loss: 241 B (39%) 10% information loss: 215 B (46%) | no information loss: 151 B (62%) 10% information loss: 122 B (69%) |

In an embodiment, the transmitted value(s) of the performance indicator(s) are compressed before transmitting said value(s). Compression may be performed for a plurality of acquired values. Hence, the first device 710 may buffer the to be transmitted value(s) to a transmission buffer (i.e. according to same rule(s) described above), and then compress the values of the buffer before transmission.

It is further noted that the contiguous value ranges referred to above may mean one dimensional or multidimensional value ranges. That is, a value range may in a way define a value space that extends on more than one axis.

In an embodiment, each value range described above is substantially a non-zero value range. That is, value ranges, at least in some embodiments, do not define a zero range.

Figure 8:
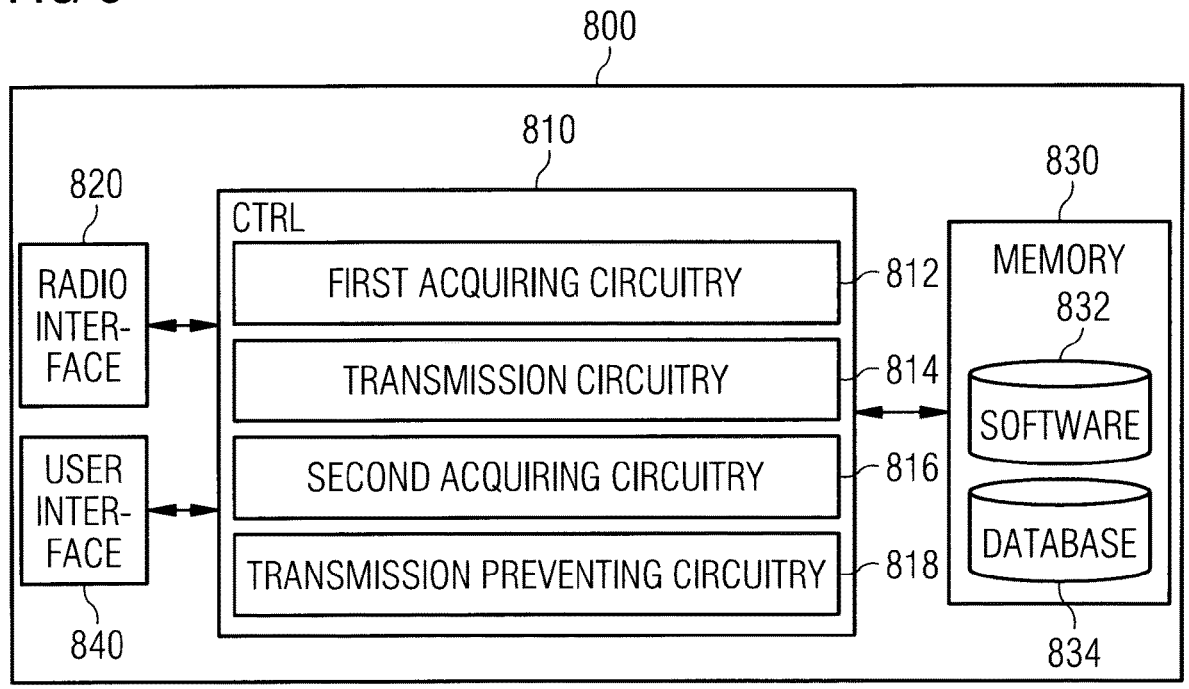
FIGS. 8 and 9 illustrate block diagrams of apparatuses according to some embodiments.
Figure 9:
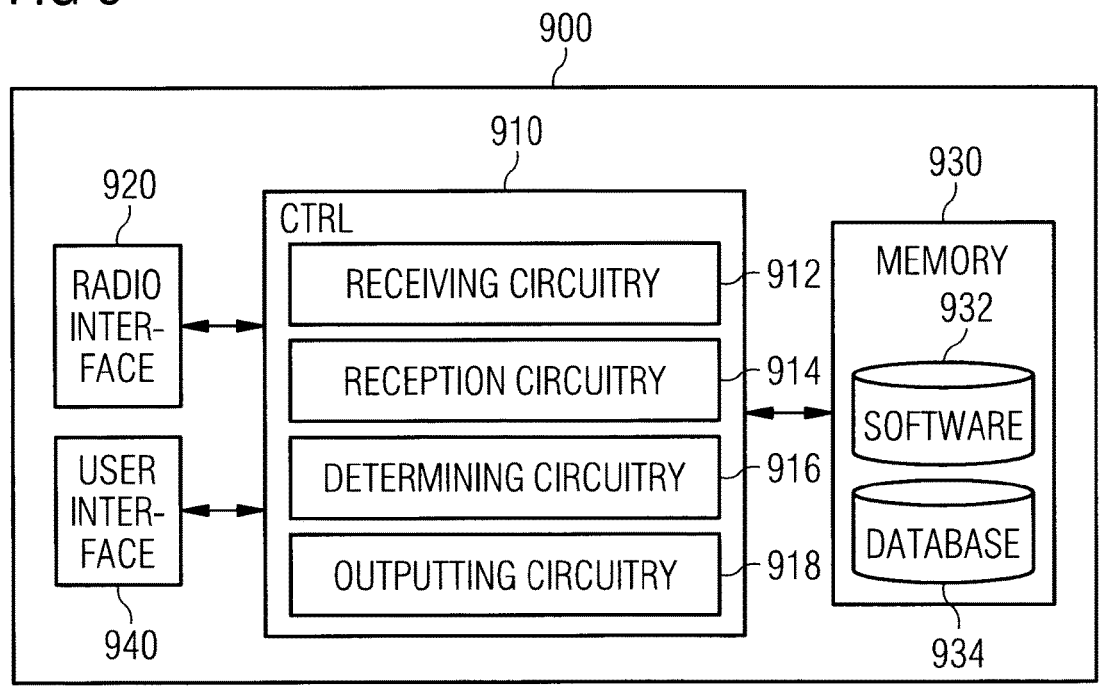

FIGS. 8 to 9 provide apparatuses 800, 900 comprising a control circuitry (CTRL) 810, 910, such as at least one processor, and at least one memory 830, 930 including a computer program code (software) 832, 932, wherein the at least one memory and the computer program code (software) 832, 932, are configured, with the at least one processor, to cause the respective apparatus 800, 900 to carry out any one of the embodiments of FIGS. 3 to 7, or operations thereof.

Referring to FIGS. 8 to 9, the memory 830, 930, may be implemented using any suitable data storage technology, such as semiconductor based memory devices, flash memory, magnetic memory devices and systems, optical memory devices and systems, fixed memory and removable memory. The memory 830, 930 may comprise a database 834, 934 for storing data.

The apparatuses 800, 900 may further comprise radio interface (TRX) 820, 920 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. For example, the TRX may enable communication between the terminal device 110 and the network element 102. Further, the TRX may provide access to the Xx-interface 190 by the network element 102 and/or by the second network element 112, for example. Similarly, TRX may enable communication with the core network. Thus, for example, first device 710 may communicate with the second device 720 (e.g. if the second device is the NMS device).

In some embodiments, the apparatuses 800, 900 may have a wired communication interface for realizing communication connectivity within a radio access network and/or a core network of a wireless communication network. For example, an access node or a base station may employ wired connections towards the core network and the NMS.

The apparatuses 800, 900 may comprise user interface 840, 940 comprising, for example, at least one keypad, a microphone, a touch display, a display, a speaker, etc. The user interface 840, 940 may be used to control the respective apparatus by a user of the apparatus 800, 900. For example, a network element may be configured using the user interface comprised in said network element. Naturally, a terminal device may comprise a user interface.

In an embodiment, the apparatus 800 may be or be comprised in a base station (also called a base transceiver station), a Node B, a radio network controller, or an evolved Node B, for example. The apparatus 800 may be the network element 102, 112, 122, for example. Further, the apparatus 800 may be the first device performing the steps of FIG. 3. In an embodiment, the functionality of the apparatus 800 is realized by a VNF (e.g. shown in FIG. 2). In an embodiment, the apparatus 800 is comprised in the network element 102 or some other network element.

Referring to FIG. 8, the control circuitry 810 may comprise a first acquiring circuitry 812 configured to perform operations described with respect to block 310, a transmission circuitry 814 configured to perform operations described with respect to block 320, a second acquiring circuitry 816 configured to perform operations described with respect to block 330, and a transmission preventing circuitry 818 configured to perform operations described with respect to block 340. The circuitry 818 may be additionally or alternatively configured to prevent transmission of a value if said value is within the same value range amongst a plurality of value ranges as the previously observed or recorded value.

In an embodiment, the apparatus 900 may be or be comprised in a base station (also called a base transceiver station), a Node B, a radio network controller, or an evolved Node B, for example. The apparatus 900 may also be a VNF, for example. In an embodiment, the apparatus 900 is the second device performing the steps of FIG. 4. In an embodiment, the apparatus 900 is a NMS device or a NMS entity.

Referring to FIG. 9, the control circuitry 910 may comprise a receiving circuitry 912 configured to perform operations described with respect to block 410, a reception circuitry 914 configured to perform operations described with respect to block 420, and a determining circuitry 916 configured to perform operations described with respect to block 430. The control circuitry 910 may additionally comprise an outputting circuitry 918 configured to perform operations described with respect to block 440.

In an embodiment, at least some of the functionalities of the apparatus 800, 900 may be shared between two physically separate devices, forming one operational entity. Therefore, the apparatus 800, 900 may be seen to depict the operational entity comprising one or more physically separate devices for executing at least some of the described processes. Thus, the apparatus 800, 900 utilizing such shared architecture, may comprise a remote control unit (RCU), such as a host computer or a server computer, operatively coupled (e.g. via a wireless or wired network) to a remote radio head (RRH) located in the base station or network element. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications-specific integrated circuit (ASIC) for a mobile phone or a similar integrated circuit in a server, a cellular network device, or another network device.

In an embodiment, at least some of the processes described in connection with FIGS. 3 to 7 may be carried out by an apparatus comprising corresponding means for carrying out at least some of the described processes.

Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 7 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 3 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method in a first device of a cellular communication system, the method comprising:
   acquiring a first value of a performance indicator;
   causing a transmission of management plane performance data to a second device of the cellular communication system, said performance data comprising said first value;
   acquiring a second value of the performance indicator, the second value following the first value;
   preventing a transmission of the second value if the second value is the same as the first value;
   acquiring a first value of a second performance indicator having a lower priority compared with the first performance indicator;
   causing a transmission of the first value of the second performance indicator;
   acquiring a second value of the second performance indicator, the second value of the second performance indicator following the first value of the second performance indicator;
   preventing a transmission of the second value of the second performance indicator if the first and second values of the second performance indicator are situated on a same value range amongst a plurality of contiguous value ranges.

2. The method of claim 1, further comprising:
   preventing the transmission of the second value if the first and second values are situated within a same value range amongst a plurality of contiguous value ranges, otherwise causing the transmission of the second value to the second device.

3. The method of claim 2, wherein each of the plurality of contiguous value ranges is of equal size.

4. The method of claim 2, wherein size of the plurality of contiguous value ranges increases or decreases according to a logarithmic function.

5. The method of claim 1, wherein the transmission of the second value is prevented, the method further comprising:
   acquiring a third value of the performance indicator, the third value following the second value;
   preventing a transmission of the third value if the second and third values are situated within a same value range amongst the plurality of contiguous value ranges, otherwise causing the transmission of the third value to the second device.

6. The method of claim 1, further comprising:
   receiving a control message configuring the first device to prevent the transmission of the second value if the second value is the same as the first value and/or prevent the transmission of the second value if the first and second values are situated within the same value range amongst the plurality of contiguous value ranges.

7. The method of claim 1, wherein the transmission of the second value of the first performance indicator is prevented if the first and second values of the first performance indicator are situated within the same value range amongst a plurality of contiguous first value ranges,
   and wherein the transmission of the second value of the second performance indicator is prevented if the first and second values of the second performance indicator are situated within the same value range amongst a plurality of contiguous second value ranges, wherein a size of each of the first value ranges is less than a size of each of the second value ranges, or the size of the first value ranges increases or decreases according to a first logarithmic function and the size of the second value ranges increases or decreases according to a second logarithmic function, the first logarithmic function decreasing faster compared with the second logarithmic function.

8. The method of claim 1, further comprising:
in response to preventing the transmission of a certain number of successively acquired performance indicator values, causing a transmission of a heartbeat signal to the second device.

9. An apparatus for a first device of a cellular communication system, the apparatus comprising:
at least one processor, and
at least one memory including a computer program code, wherein the at least one memory and the computer program code are configured, with the at least one processor, to cause the apparatus to:
acquire a first value of a performance indicator;
cause a transmission of management plane performance data to a second device of the cellular communication system, said performance data comprising said first value;
acquire a second value of the performance indicator, the second value following the first value;
prevent transmission of the second value if the second value is the same as the first value;
acquire a first value of a second performance indicator having a lower priority compared with the first performance indicator;
cause transmission of the first value of the second performance indicator;
acquire a second value of the second performance indicator, the second value of the second performance indicator following the first value of the second performance indicator;
prevent transmission of the second value of the second performance indicator if the first and second values of the second performance indicator are situated on a same value range amongst a plurality of contiguous value ranges.

10. The apparatus of claim 9, wherein the at least one memory and the computer program code are configured, with the at least one processor, to cause the apparatus to prevent the transmission of the second value if the first and second values are situated within a same value range amongst a plurality of contiguous value ranges, otherwise cause the transmission of the second value to the second device.

11. The apparatus of claim 9, wherein the at least one memory and the computer program code are configured, with the at least one processor, to cause the apparatus to:
prevent the transmission of the second value;
acquire a third value of the performance indicator, the third value consecutive to the second value; and
prevent transmission of the third value if the second and third values are situated within a same value range amongst the plurality of contiguous value ranges, otherwise cause the transmission of the third value to the second device.

12. The apparatus of claim 9, wherein the at least one memory and the computer program code are configured, with the at least one processor, to cause the apparatus to:
receive a control message configuring the first device to prevent the transmission of the second value if the second value is to the same as the first value and/or to prevent the transmission of the second value if the first and second values are situated within the same value range amongst the plurality of contiguous value ranges.

13. The apparatus of claim 9, wherein the at least one memory and the computer program code are configured, with the at least one processor, to cause the apparatus to:
prevent the transmission of the second value of the performance indicator if the first and second values of the performance indicator are situated within the same value range amongst a plurality of contiguous first value ranges,
and prevent the transmission of the second value of the second performance indicator if the first and second values of the second performance indicator are situated within the same value range amongst a plurality of contiguous second value ranges,
wherein a size of each of the first value ranges is less than a size of each of the second value ranges, or the size of the first value ranges increases or decreases according to a first logarithmic function and the size of the second value ranges increases or decreases according to a second logarithmic function, the first logarithmic function decreasing faster compared with the second logarithmic function.

14. The apparatus of claim 9, wherein the at least one memory and the computer program code are configured, with the at least one processor, to cause the apparatus to cause, in response to preventing the transmission of a certain number of successively acquired performance indicator values, transmission of a heartbeat signal to the second device.

15. A computer program product embodied on a non-transitory computer readable medium readable by a computer and, when executed by the computer, configured to cause the computer to execute a computer process comprising all the steps of the method according to claim 1.

* * * * *